No. 665,195. Patented Jan. 1, 1901.
A. G. ENEAS.
STORAGE BATTERY.
(Application filed Oct. 9, 1897. Renewed June 13, 1900.)
(No Model.) 2 Sheets—Sheet 2.
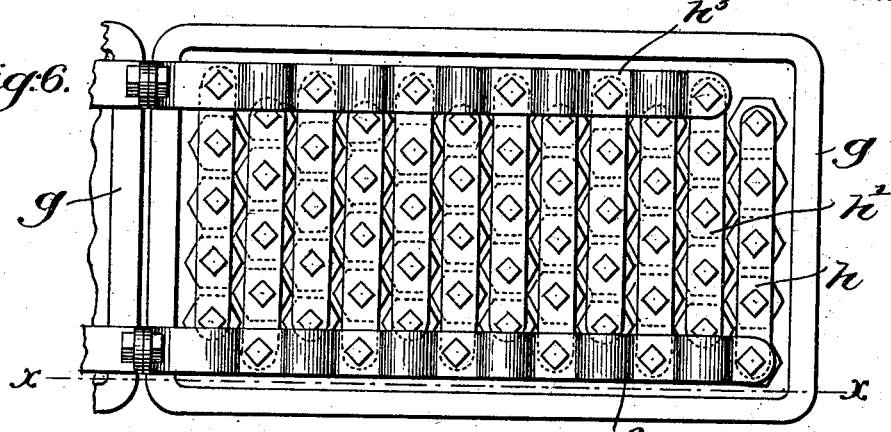
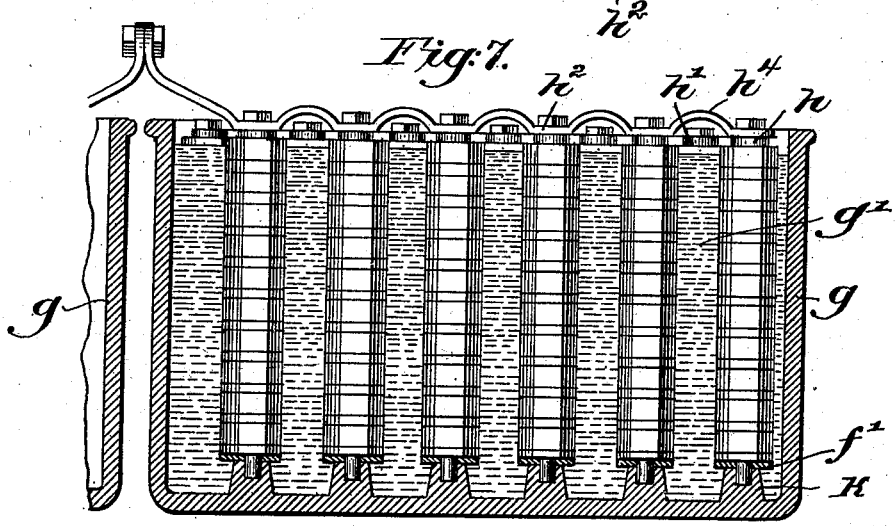
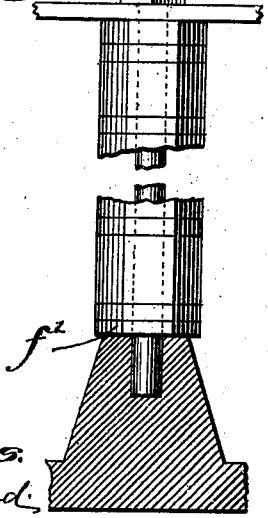
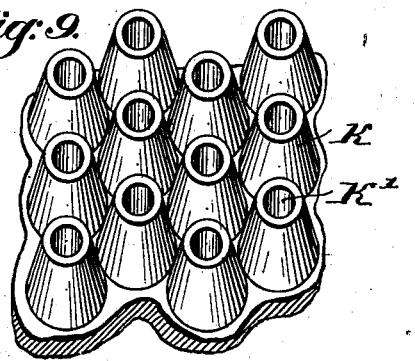
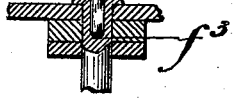
Witnesses:
F. J. Drummond
Walter E. Lombard
Inventor:
Aubrey G. Eneas.
by Crosby Gregory
Attys.
THE NORRIS PETERS CO., PHOTO-LITHO., WASHINGTON, D. C.

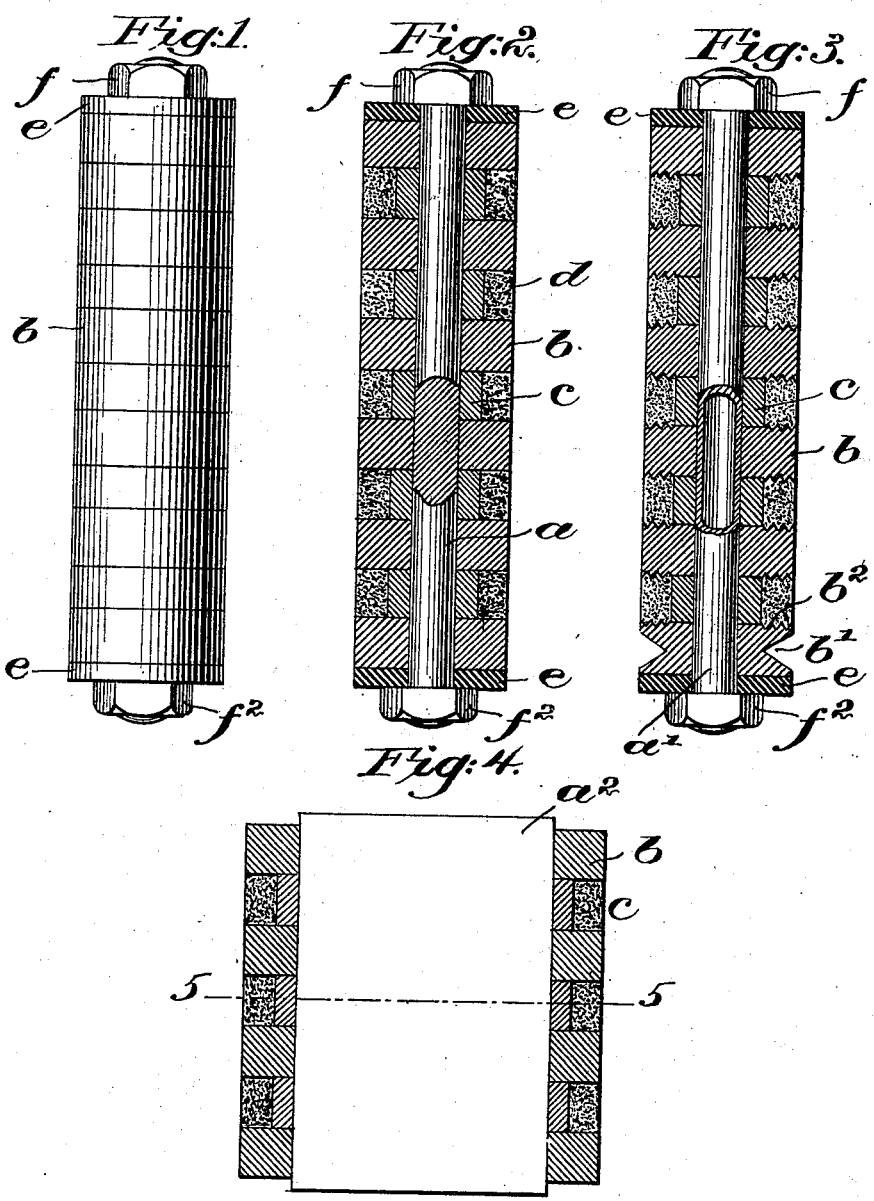

UNITED STATES PATENT OFFICE.

AUBREY G. ENEAS, OF BOSTON, MASSACHUSETTS.

STORAGE BATTERY.

SPECIFICATION forming part of Letters Patent No. 665,195, dated January 1, 1901.

Application filed October 9, 1897. Renewed June 13, 1900. Serial No. 20,218. (No model.)

*To all whom it may concern:*

Be it known that I, AUBREY G. ENEAS, a subject of the Queen of Great Britain, and a resident of Boston, county of Suffolk, State of Massachusetts, have invented an Improvement in Storage Batteries, of which the following description, in connection with the accompanying drawings, is a specification, like letters on the drawings representing like parts.

My invention is an improvement in storage batteries or electrical accumulators, my invention relating particularly to the form of grid and the materials of which it is made, with a view to reducing the weight of the battery, cheapening its cost of production or manufacture, and increasing its capacity for charge and discharge without injury to the battery. Batteries of this class are usually made by impressing in a perforated or grooved grid suitable active material, such as peroxid of lead or other active material, and the problem which I have attempted to solve is to reduce the weight of the cells and at the same time increase the extent of surface or area of the oxid coming in contact with the acid or other electrolyte in which the plates are immersed. The usual commercial requirements demand a high rate of discharge, and accordingly the grids have been primarily formed with a view to exposing at the surface thereof as large an area of the active material as possible, it being understood that the rate of charge and discharge varies as the area of oxid in contact with the electrolyte; but when the battery is drawn largely upon, as is the case in traction-work, for example, it causes the oxid to swell or buckle by reason of the large number of amperes required, and the oxid tends thereby to fall out of the grooves or from between the partitions of the grid, which normally serve to retain it, so that the grid necessarily has had to be made of a size which has materially limited the extent of exposed surface of the active material. In the embodiment of my invention herein shown I have obviated the objections above noted by providing a grid comprising a central rod or core, which preferably constitutes both a support and a conductor, and a plurality of permeable non-conducting partitions or washers spaced apart along the rod, between which the active material is held, said active material being preferably concentric with the rod. By the term "permeable" I do not mean to include a plate having holes or perforations, as in United States Patent No. 462,449, but I mean capable of allowing the passage of the electrolyte through and into the substance itself and without the displacement of any portion of said substance. The washer-like partitions allow the acid to permeate them, and thereby enormously increase the area of the active material practically in direct access to the acid. The form of the grid conduces to strength, and thereby enables me to make it much lighter than would otherwise be possible, for the reason that all tendency of the oxid to cause the plate to buckle or bend under the swelling thereof is self-counteracted, because inasmuch as there is precisely the same amount of active material on one side of the core as on any and all other sides thereof any radial movement of the material on one side meets an opposite and precisely similar movement on the opposite side.

Various other features of my invention and the details of construction thereof will be pointed out in the following description, reference being had to the accompanying drawings, illustrative of a preferred embodiment of my invention, and the latter will be more particularly defined in the claims.

Figure 1 is an enlarged front elevation of an electrode built up according to my invention. Figs. 2 and 3 are central vertical sections thereof, broken away to show different forms of cores, the latter figure also showing one means of interlocking the active material. Fig. 4 is a central vertical section taken on the line 4 4, Fig. 5, showing a modified form of the electrode. Fig. 5 is a transverse section thereof, taken on the line 5 5, Fig. 4. Fig. 6 is a top plan view of the battery embodying my invention. Fig. 7 is a longitudinal section thereof. Fig. 8 is an enlarged broken detail, partly in section and partly in elevation, showing further details of construction. Fig. 9 is a perspective view of a portion of the bottom of the cell, showing the foot steps or bearings. Fig. 10 is a fragmentary view in section, showing one means of securing the core in place.

In carrying out my invention I provide a core in the form of a rod $a$, tube $a'$, or plate $a^2$, of some conducting material—such as lead, for example—and on this core I arrange a number of washers, plates, or partitions $b$, of some permeable material—such as brick, unglazed porcelain, carbon, or similar rigid compounds, non-conductive or conductive—that will permit the acid or exciting-electrolyte to permeate it. Preferably between the partitions $b$ I interpose separators $c$, which serve to space apart the washer-like partitions $b$, the separators and partitions being movable on the core and together therewith constituting a grid or support for the active material $d$, which may be the usual oxid, or spongy lead, or any other suitable substance preferred to constitute, together with the support, the positive or negative electrodes for the battery. At one or both ends of the electrode I interpose a yielding medium (herein shown as a rubber or spring disk $e$) which permits the body of the electrode to expand and contract, as may be necessary in use, and yet maintains the parts from the possibility of disruption, the whole being held together by a clamping-nut $f$ at one end of the core and a supporting-shoulder $f'$ or nut $f^2$ at the opposite end, or instead thereof the end of the core may be bored out, as shown at $f^3$, Fig. 10, to receive a small pin $f^4$, driven into the end of the rod, which swages or expands the lead or metal into contact with the adjacent parts. The separators and washers are put onto the rod alternately, so as to leave spaces for the active material. The separators when used are also of conducting material and serve both to space apart the partitions and also as conductors for the active material $d$ to the core, the latter also, as before stated, being both a support and a conductor. The washers or partitions $b$ serve as a grid or frame for the oxid and at the same time, being permeable and not acted upon by the acid, allow the acid or electrolyte access to the sides of the oxid contained between them, so that the area of the oxid exposed on the rod is not only the circumferential area of the oxid which may be visible to an observer, but includes also the top and bottom sides or faces of the annuli $d$. The efficiency of the electrode is greatly increased by reason of this construction, and, moreover, the cost of construction is very much reduced, inasmuch as it is an easy and simple matter to string the washers on the rods, as stated, and then fill in with the active material, the rigid partitions maintaining the proper shape of the grid for the operation of pressing in the red lead; also, instead of the usual lead partitions or ribs, as heretofore provided, the much lighter porcelain or permeable clay or carbon partitions are used, and thereby a lighter battery is obtained bulk for bulk.

The number of electrodes used in a battery may vary according to the requirements of the work. I prefer to arrange the electrodes as shown in Fig. 6, where it will be observed that a large number of electrodes are contained in a usual glass or rubber jar $g$ for the electrolyte $g'$, alternate electrodes being connected in parallel or multiple by leads $h\ h'$ across the jar, alternate lines thereof having their leads secured to conductors of opposite polarity at the opposite sides of the jar, as indicated at $h^2\ h^3$, the latter leads being arranged as indicated at $h^4$ in order to permit an adjacent lead to pass thereunder, as clearly shown in Figs. 6 and 7. This arrangement is the most economical for occupying the space within the jar. A further economy of space is attained by making the form of the electrodes hexagonal, as shown in Fig. 6, which gives the characteristic of affording the greatest area for a given space and yet providing the necessary spaces between the electrodes for the free circulation of the electrolyte. The positive and negative electrodes are herein shown as identical in form, and it will be understood that they are spaced alternately, as will be evident from the connections clearly shown in Fig. 6, so that the greatest efficiency can be obtained.

A further feature of my invention resides in providing glass, rubber, or other non-corrodible foot steps or bearings $k$ at the bottom of the cell in order to maintain the electrodes properly positioned and separated in the cell. These foot-steps may be formed integrally or otherwise secured to the bottom of the jar. Each electrode has its core extended at the lower end or is otherwise provided with a projection to enter or interlock with a recess $k'$, provided centrally in the bearing $k$, the latter having, preferably, a conical form, as shown, and being less in circumference at its upper end than the adjacent portion of the electrode, the object of this provision being to make it absolutely impossible that any of the active material of the electrodes which may become disintegrated from the body of the electrode should catch or lodge at the lower end of the electrode, and thereby, perhaps, short-circuit the battery by forming a connection with an adjacent electrode. By having the foot steps or bearings $k$ formed, as shown, in shape of pillars whatever matter becomes disintegrated from the electrodes will necessarily fall down to the bottom of the jar entirely out of range of the electrodes, and as the latter are held up from the bottom by the bearings $k$ a considerable quantity of active material may accumulate in the bottom of the jar before occasioning any danger of short-circuiting the electrodes.

With reference to the feature of my invention which resides in stringing the washers or partitions on a rod or other core to form a grid it will be understood that the washers and electrodes may be of any convenient shape, and that also in regard to having the partitions permeable the shape may be considerably varied, inasmuch as the object of this feature is to increase the effective area of the battery by giving the electrolyte free access to the sides or faces of the active material adjacent the partitions, as well as the peripheral surfaces thereof. One such form is shown in Figs. 4 and 5, where $a^2$ designates a core in the shape of a flat plate, on which the washers and separators are arranged as before, being, however, elongated in order to conform to the shape of the core. The washers or partitions $b$ may be recessed peripherally, as shown at $b'$, Fig. 3, in order to give freer access of the electrolyte to the active material $d$.

In order to minimize the tendency of the active material to crumble and fall out under the expansion and contraction thereof, I prefer to form concentric annular grooves in the adjacent faces of the partitions, as indicated at $b^2$, Fig. 3.

In operation the acid or other electrolyte acts not only upon the exposed peripheral surfaces of the oxid of lead or spongy lead or other substance used as active material, but it is freely admitted by the permeable clay or other separator $b$ to the sides or faces of the active material, thereby greatly increasing the efficiency and power of the electrode. The current is transmitted along the leads $h$ $h^2$ $h'$ $h^3$ and the conductors $a$ (or $a'$ $a^2$) and $c$, provided the latter are used. When the battery is brought into active service, the expansion of the active material $d$ cannot bend or distort the electrode, because it operates equally on all sides thereof, and its longitudinal movement is taken up by the yielding disks $e$ at the ends of the electrode, the corrugations $b^2$ serving also to prevent disruption of the active material. If, however, any of the latter should dislodge and fall, it is prevented from short-circuiting the battery by reason of the conical foot-steps $k$, which support the electrode away from the bottom of the jar and give ample room for the accumulation of considerable material in the bottom of the jar before endangering the efficiency of the battery.

I regard my invention as new in providing a conducting-support, either plate or rod, surrounded by a plurality of independent rigid partitions of permeable material, so as to form a grid or frame, between which is provided the active material or composition of the accumulator. The feature is also new of having the electrodes uniformly and permanently spaced apart by the foot-steps, separated and in conical form, so as to shed the debris and keep it out of any possible short-circuiting contact with the electrodes. All the above points I intend to cover broadly in this patent.

While I have herein described in detail certain embodiments of my invention, I wish it understood that I am in no wise restricted to these details, inasmuch as a wide range of changes in form, construction, and relation of parts is within the contemplation of my invention, and I do not limit the latter otherwise than as expressed in the claims taken in connection with this specification.

Having described my invention, what I claim as new, and desire to secure by Letters Patent, is—

1. In a storage battery, an electrode comprising a conducting-core, a plurality of independent, rigid, permeable partitions movable thereon, and active material interposed between the said independent partitions, substantially as described.

2. In a storage battery, an electrode comprising a conducting-core, a plurality of independent, rigid, permeable, non-metallic partitions movable thereon, and active material interposed between said partitions, substantially as described.

3. In a storage battery, an electrode comprising a conducting-core, a plurality of independent non-metallic partitions movable thereon, separators on said core between said partitions, and active material interposed between the partitions, inclosing said separators, and filling the spaces between the said partitions, substantially as described.

4. In a storage battery an electrode comprising a core, a plurality of independent permeable partitions movable thereon, and active material interposed between said partitions, said partitions having annular grooves formed concentrically in their faces adjacent the active material, substantially as described.

5. In a storage battery, an electrode comprising a conducting-support having a plurality of permeable partitions mounted thereon, and active materials interposed and filling the entire spaces between and immediately adjacent on both sides of said permeable partitions whereby the electrolyte has free action on the peripheral surface of said material, and also through the permeable partitions on the adjacent sides or faces of the said material, substantially as described.

6. In a storage battery, the combination with a suitable conducting-support, of a plurality of independent, rigid, permeable pieces movably mounted thereon, and active material filling the spaces between and retained by said permeable pieces, substantially as described.

7. In a storage battery, the combination with a suitable conducting-support, of a plurality of independent, rigid, permeable, non-metallic pieces movably mounted thereon, and active material interposed between and retained by said permeable pieces, substantially as described.

8. In a storage battery, the combination with a suitable conducting-support, of a plurality of independent pieces of permeable material, and active material interposed between and retained by said permeable pieces, said pieces having peripheral recesses in their exposed edges for permitting the electrolyte to more readily penetrate them, substantially as described.

9. In a storage battery, the combination with a plurality of electrodes, of conical foot-steps, one for each electrode between the electrode and a base, and arranged to separate and uniformly space said electrodes apart, said foot-steps being smaller at their upper ends than the adjacent ends of the electrodes, whereby they offer firm supports for the electrodes and cause all falling debris to fall away from the electrodes, substantially as described.

10. In a storage battery, the combination with a plurality of electrodes, of independent foot-steps, one for each electrode between the electrode and a base, and arranged to separate and uniformly space said electrodes apart, said foot-steps being in the form of pillars shaped at their upper ends to interlock with the bottom ends of the electrodes and being smaller at their upper ends than the adjacent lower ends of the electrodes, whereby they offer firm supports for the electrodes and cause all falling debris to fall away from the electrodes, substantially as described.

11. In a storage battery, an electrode comprising a central conducting-core, a plurality of independent, rigid, permeable non-metallic partitions, indestructible by the electrolyte, said partitions being strung on said core and freely movable longitudinally thereof, active material between and adjacent said partitions, and one or more yielding compression members carried on said core permitting the free longitudinal expansion and contraction of the active material of the electrode, substantially as described.

12. In a storage battery, a conducting-core, a plurality of independent, rigid, non-metallic partitions, indestructible by the electrolyte or electric current of the battery, said partitions being spaced apart on said core, and active material filling the spaces between said partitions, substantially as described.

In testimony whereof I have signed my name to this specification in the presence of two subscribing witnesses.

AUBREY G. ENEAS.

Witnesses:
GEO. H. MAXWELL,
JOHN C. EDWARDS.